(12) United States Patent
Uchino

(10) Patent No.: US 6,580,459 B2
(45) Date of Patent: Jun. 17, 2003

(54) DIGITAL IMAGE SENSING APPARATUS, IMAGE PROCESSING SYSTEM, AND DIGITAL IMAGE SENSING METHOD

(75) Inventor: Fumiko Uchino, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/945,743

(22) Filed: Sep. 5, 2001

(65) Prior Publication Data

US 2002/0030755 A1 Mar. 14, 2002

(30) Foreign Application Priority Data

Sep. 11, 2000 (JP) .................................. 2000-275106

(51) Int. Cl.[7] .............................................. H04N 5/225
(52) U.S. Cl. ...................... 348/342; 348/360; 348/361
(58) Field of Search ................................. 348/342, 360, 348/361, 586, 652

(56) References Cited

U.S. PATENT DOCUMENTS

| | | | | |
|---|---|---|---|---|
| 5,070,407 A | * | 12/1991 | Wheeler et al. | 348/342 |
| 5,155,585 A | * | 10/1992 | Ishikawa | 348/360 |
| 5,705,806 A | | 1/1998 | Matsuda et al. | |
| 5,969,754 A | * | 10/1999 | Zeman | 348/342 |
| 6,366,316 B1 | * | 4/2002 | Parulski et al. | 348/586 |

FOREIGN PATENT DOCUMENTS

| | | |
|---|---|---|
| JP | A-7-284111 | 10/1995 |
| JP | A-7-307702 | 11/1995 |
| JP | A-10-112816 | 4/1998 |

* cited by examiner

*Primary Examiner*—Wendy R. Garber
*Assistant Examiner*—Catherine J. Toppin
(74) *Attorney, Agent, or Firm*—Burns, Doane, Swecker & Mathis, LLP (57) ABSTRACT

A digital camera is provided with an optical filter unit 43 which is movable in the slide direction SL in front of the CCD 41, and infrared light emitters 25 and 32 for emitting near-infrared light. The optical filter 43 has an infrared cut filter 45 for cutting light in the infrared range, and a visible light cut filter for selectively transmitting light of the infrared range by cutting light in the visible light range. While maintaining the identicalness of the main object, the infrared cut filter 45 is disposed above the CCD 41 to acquire visible light image data via the CCD 41, and the object is irradiated with infrared light emitted from the infrared emitters 25 and 32, and the visible light cut filter is disposed above the CCD 41 to acquire infrared image data, i.e., non-visible light image data, by the CCD 41. As a result, a visible light image and a non-visible light image are easily acquired of the same object.

16 Claims, 9 Drawing Sheets

DIGITAL IMAGE SENSING APPARATUS, IMAGE PROCESSING SYSTEM, AND DIGITAL IMAGE SENSING METHOD

This application is based on application No. 2000-275106 filed in Japan, the content of which is hereby incorporated by reference.

BACKGROUND OF THE INVENTION

1. Field of the Invention

The present invention relates to digital image sensing art for acquiring image data using an image sensing element as an image sensor.

2. Description of the Related Art

In recent years, conventional silver halide film cameras have come to be replaced by the practicalization of digital image sensing apparatuses such as digital cameras and the like which convert an optical image of an object to electronic image signals by an i mage sensing element, and record the electronic i mage signals on a removable memory card which is the alternative to conventional film.

There are digital image sensing apparatuses which may acquire a visible light image and infrared image (invisible light image) of the same object via a single video camera, such as disclosed in Japanese Laid-Open Patent Application No. H10-341446. Fitting and combining the visible light image and invisible light image acquired by such image sensing devices is easily accomplished.

Such image sensing devices are complex because their construction separately provides an image sensing element for acquiring a visible light image, and an image sensing element for acquiring an infrared image.

SUMMARY OF THE INVENTION

In view of the previously described problems, the present invention relates to a system provided with digital image sensing art capable of easily acquiring a visible light image and an invisible light image of the same object.

A digital image sensing apparatus comprises an image sensor for acquiring an object image as image data; a first filter for selectively transmitting light of a first wavelength band of visible light; a second filter for selectively transmitting light of a second wavelength band of different from the first wavelength; a switching device for arranging and switching the first filter and the second filter in an optical path of a photographic optical system connecting the object and the image sensor; a controller for controlling a first operation for acquiring by the i mage sensor an object image transmitted through the first filter as first image data, and a second operation for acquiring by the image sensor an object image transmitted through the second filter as second image data while maintaining substantially similar characteristics of the object; and a recording device for recording the first image data and the second image data as the same file on a recording medium.

An image processing system comprises a digital image sensing apparatus of claim 1 and information processing device, wherein the information processing device has an image processing device which extracts a main object image from the first image data based on the second image data, and executes image processing on the main object image of the extracted first image data.

A digital image sensing method for acquiring an object image as image data, comprises following steps of: acquiring an object image transmitted through a first filter, which selectively transmits light of a first wavelength band of visible light, as first image data via an image sensor; and acquiring an object image transmitted through a second filter, which selectively transmits light of a second wavelength band different from the first wavelength band, as second image data via an image sensor, and wherein the first image data and the second image data are acquired while maintaining substantially similar characteristics by executing the first image acquisition process and the second image acquisition process in a specific sequence; and recording the first image data and the second i mage data as a single file on a recording medium.

A computer program for executing image processing by a computer t o function as an information processing apparatus, wherein the computer program executes processes of the digital image sensing method described above.

A computer readable recording medium for recording a image processing program for executing image processing by a computer, wherein the image processing program execute processes of the digital image sensing method described above.

A digital camera comprises an image sensor for acquiring an object image as image data; a light emitting device for emitting infrared light at an irradiation angle in a field angle approximately equal to a filed angle of an image sensing optical system; a first filter for selectively transmitting light of the visible light wavelength band; a second filter for selectively transmitting light of the infrared light wavelength band; a switching device for arranging and switching the first filter and the second filter in an optical path of the image sensing optical system connecting the object and the image sensor; and a controller for controlling a first operation for acquiring by the image sensor an object image transmitted through the first filter as first image data, and a second operation for acquiring by the image sensor an object image transmitted through the second filter as second image data by controlling the actuation of the switching device.

BRIEF DESCRIPTION OF THE DRAWINGS

These and other objects and features of this invention will become clear from the following description, taken in conjunction with the preferred embodiments with reference to the accompanied drawings in which:

FIGS. 8(*a*) and 8(*b*) show an example of a visible light image and an example of an infrared image acquired by the digital camera 1;

FIGS. 9(*a*) and 9(*b*) show an example of a visible light image and an example of an infrared image acquired by the digital camera 1;

DETAILED DESCRIPTION OF THE PREFERRED EMBODIMENTS

First Embodiment
Essential Structure of a Digital Camera

Figure 1:
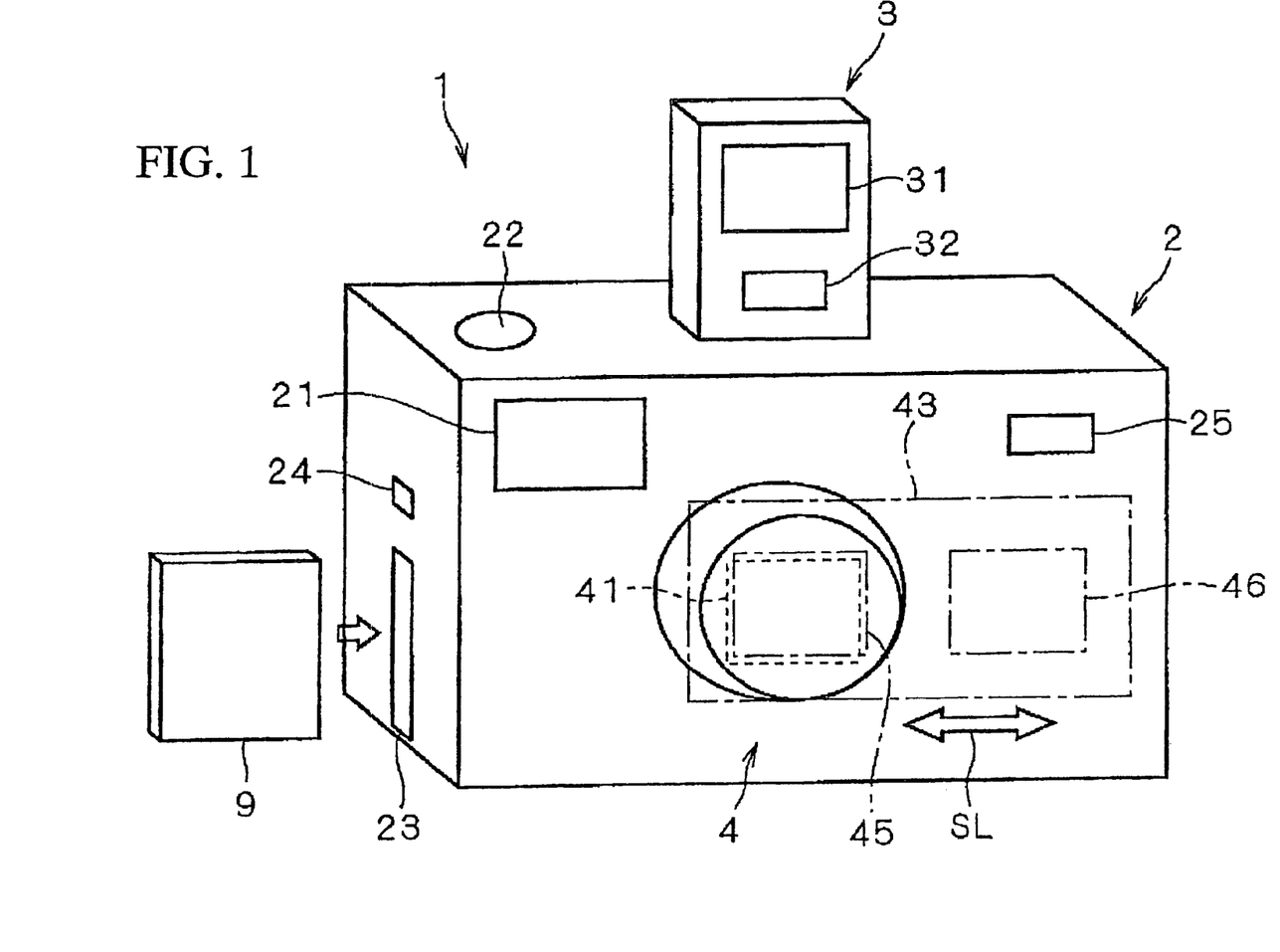
FIG. 1 is a perspective view showing essential structure of a digital camera 1 of an embodiment of the present invention.
Figure 2:
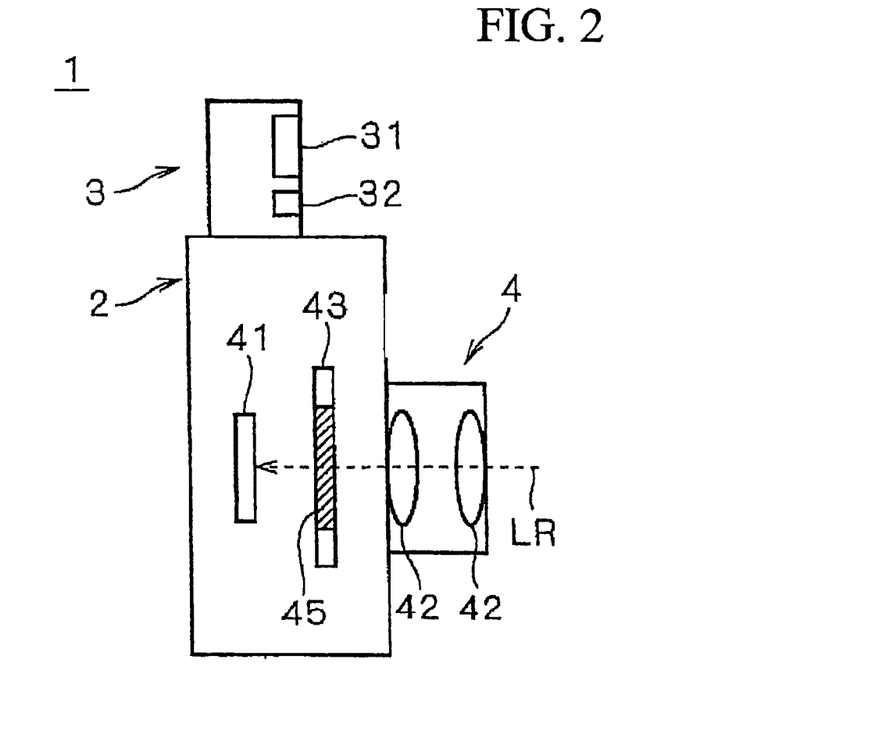
FIG. 2 is a vertical section view of the digital camera 1.

FIG. 1 is a perspective view showing the essential structure of a digital camera 1 of an embodiment of the present invention. FIG. 2 is a vertical section view of the digital camera 1.

The digital camera 1 comprises a box-shaped camera body 2, a light-emitting device 3 detachable from the camera body 2, and an image sensing unit 4.

The camera body 2 is provided with an optical viewfinder 21, shutter release button 22, slot 23 for loading a removable memory card 9, eject button 24 for ejecting a memory card 9 within the slot 23, and infrared light emitter 25 for emitting near-infrared radiation.

The infrared emitter 25 generates near-infrared radiation as supplemental light for autofocusing, which irradiates toward an area corresponding to the autofocus area of the photographic object field.

The image sensing unit 4 is provided with a charge coupled device (CCD) 41 as a solid state image sensing element, taking lens 42 including two lens elements, and an optical filter 43 arranged medially to the CCD 41 and the taking lens 42.

The CCD 41 opto-electrically converts an optical object image formed passing through the taking lens 42 and the optical filter 43 to obtain an electric image signal.

The light emitting unit 3 is provided with a flash 31, and an infrared emitter 32 for emitting near-infrared radiation.

The infrared emitter 32 emits near-infrared radiation toward the substantially complete object area so as to suitably acquire an infrared image of the object as described later.

In this case the infrared emitter 25 has an irradiation angle of narrow scope, and the infrared emitter 32 has an irradiation angle approximately equal to the field angle of the taking lens. However, the present invention is not limited to this arrangement, inasmuch as two infrared emitters may both emit light when acquiring an infrared image. Furthermore, one infrared emitter having a certain irradiation angle may be used for both autofocus supplement light and infrared image acquisition.

Figure 3:
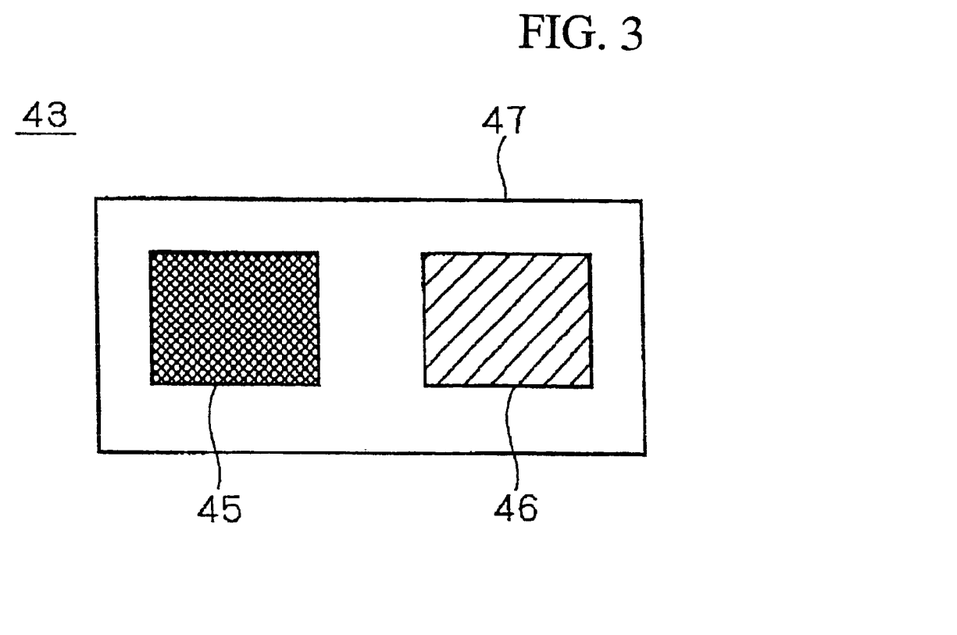
FIG. 3 shows the structure an optical filter unit 3.

FIG. 3 shows the structure of the optical filter 43.

The optical filter 43 is provided with an infrared cut filter 45 and visible light cut filter 46 having mutually different characteristics of spectral transmittance, and has a rectangular-shaped holder 47 for holding the filters 45 and 46.

Figure 4:
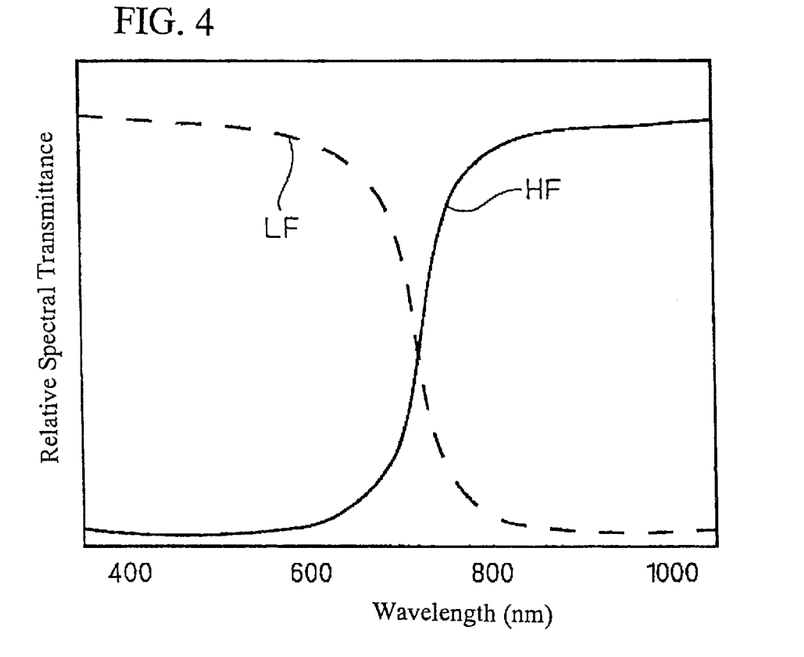
FIG. 4 is a graph showing the characteristics of an infrared light cutting filter 45 and a visible light cutting filter 46 relating to spectral transmittance.

FIG. 4 is a graph showing the spectral transmittance characteristics of the infrared cut filter 45 and the visible light cut filter 46.

The horizontal axis in the graph of FIG. 4 show the wavelength of the light, and the vertical axis show the relative spectral transmittance.

In the graph of FIG. 4, the characteristics of the infrared cut filter 45 is represented by the curve LF, and the characteristics of the visible light cut filter 46 is represented by the curve HF.

The infrared cut filter 45 is a filter for cutting light in the infrared range above a wavelength of approximately 700 n m, i.e., a n optical filter for selectively transmitting light in the visible light wavelength range. The infrared cut filter 45 is generally disposed on the optical path connecting the image sensing element and the object to improve image quality.

The visible light cut filter 46 is a filter for cutting light in the visible light range below a wavelength of approximately 700 nm, i.e., an optical filter for selectively transmitting only infrared light, that is, light in a wavelength range different from the wavelength range of visible light.

Figure 5:
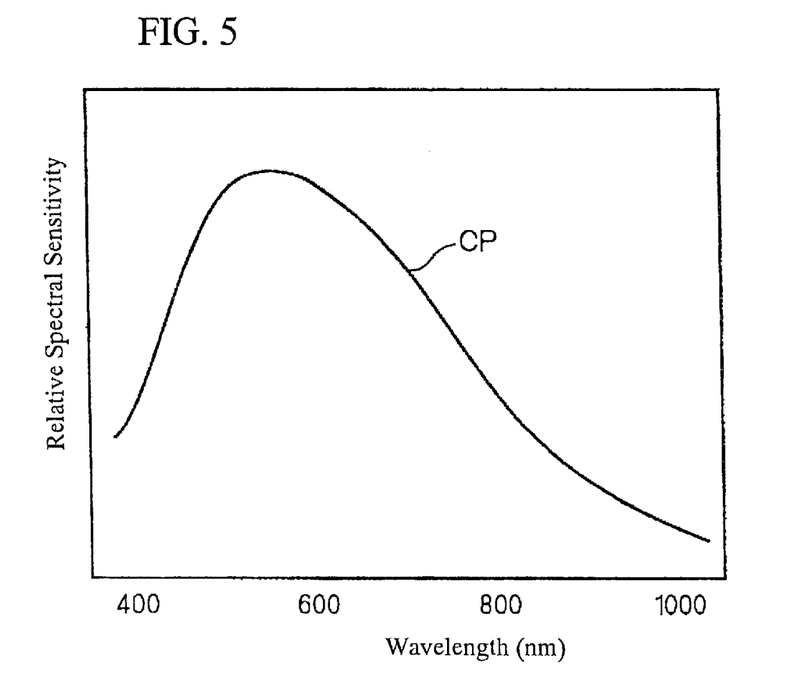
FIG. 5 is a graph showing the characteristics of the CCD relating to spectral sensitivity.

FIG. 5 is a graph showing the characteristics of the CCD generally relating to spectral sensitivity.

The horizontal axis in the graph of FIG. 5 shows the light wavelength, and the vertical axis shows the relative spectral sensitivity.

The CCD 41 is constructed to acquire a color image by the object image passing through the red (R), green (G), and blue (B) color filters. The characteristics curve CP represents the spectral sensitivity of the CCD with these color filters removed, i.e., the spectral sensitivity of a monochrome CCD.

The characteristics curve CP shows spectral sensitivity to approximately 1,000 nm, and the CCD 41 is capable of acquiring images in the infrared range above 700 nm.

On the other hand, the infrared range above 700 nm is somewhat lower than other ranges. That is, when acquiring an image in the infrared range of reduced sensitivity of the CCD 41, it is desirable that the object is irradiated with infrared light to improve the image sensing efficiency.

As described above, the CCD 41 is capable of acquiring an object image in the visible light range passing through the infrared cut filter having the characteristics curve LF as visible light image data, and is capable of acquiring an object image in the infrared range passing through the visible light cut filter having the characteristic curve HF as infrared image data, i.e., non-visible light image data.

Figure 6:
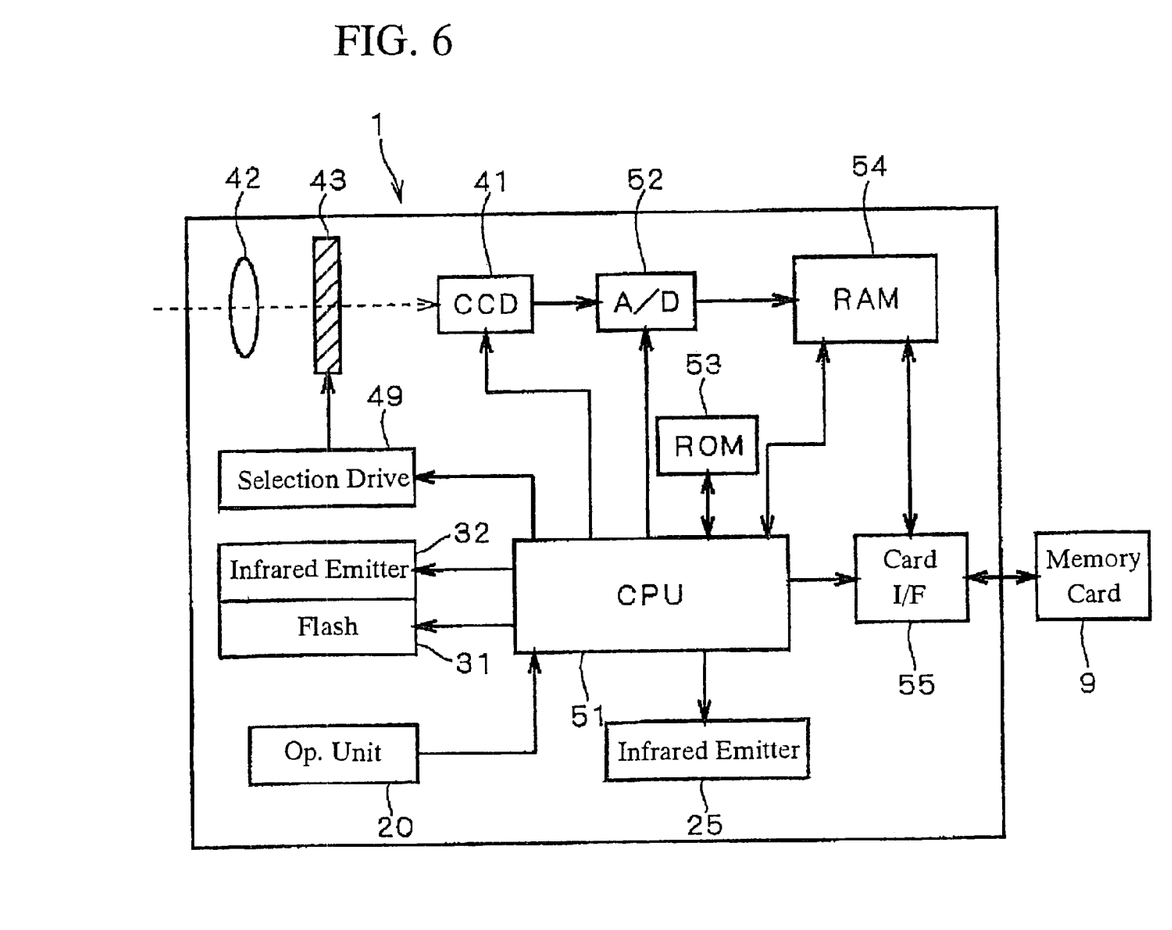
FIG. 6 shows the function blocks of the digital camera 1.

FIG. 6 shows function blocks of the digital camera 1.

In addition to the previously mentioned CCD 41 and the like, the digital camera 1 is provided with a CPU 51, A/D converter 52 electrically connected to the CPU 51, ROM 53, RAM 54, card I/F 55, operation unit 20, and selection drive unit 49.

The A/D converter 52 converts each pixel signal of the image signal acquired by the CCD 41 to a digital signal.

The ROM 53 stores programs related to the functions of the digital camera 1 executed by the CPU 51.

The RAM 54 is a memory for temporarily storing image data output from the A/D converter 52. The image data stored in the RAM 54 are subjected to image processing by the CPU 51, and can be recorded on the memory card 9 via the card I/F 55.

The card I/F 55 is an interface for writing image data to and reading image data from the memory card 9.

The operation unit 20 has various types of switches in addition to t he previously mentioned shutter release button 22.

The selection drive unit 49 moves the optical filter 43 in the slide direction SL (refer to FIG. 1), so as to dispose the infrared cut filter 45 or the visible light cut filter 46 in the optical path LR connecting the object and the CCD 41. In this way the wavelength range of the light used for image sensing in the CCD 451 can be selected.

The CPU 51 performs general control of the image sensing operation of the digital camera 1 organically controlling all parts.

Operation of Digital Camera 1

Figure 7:
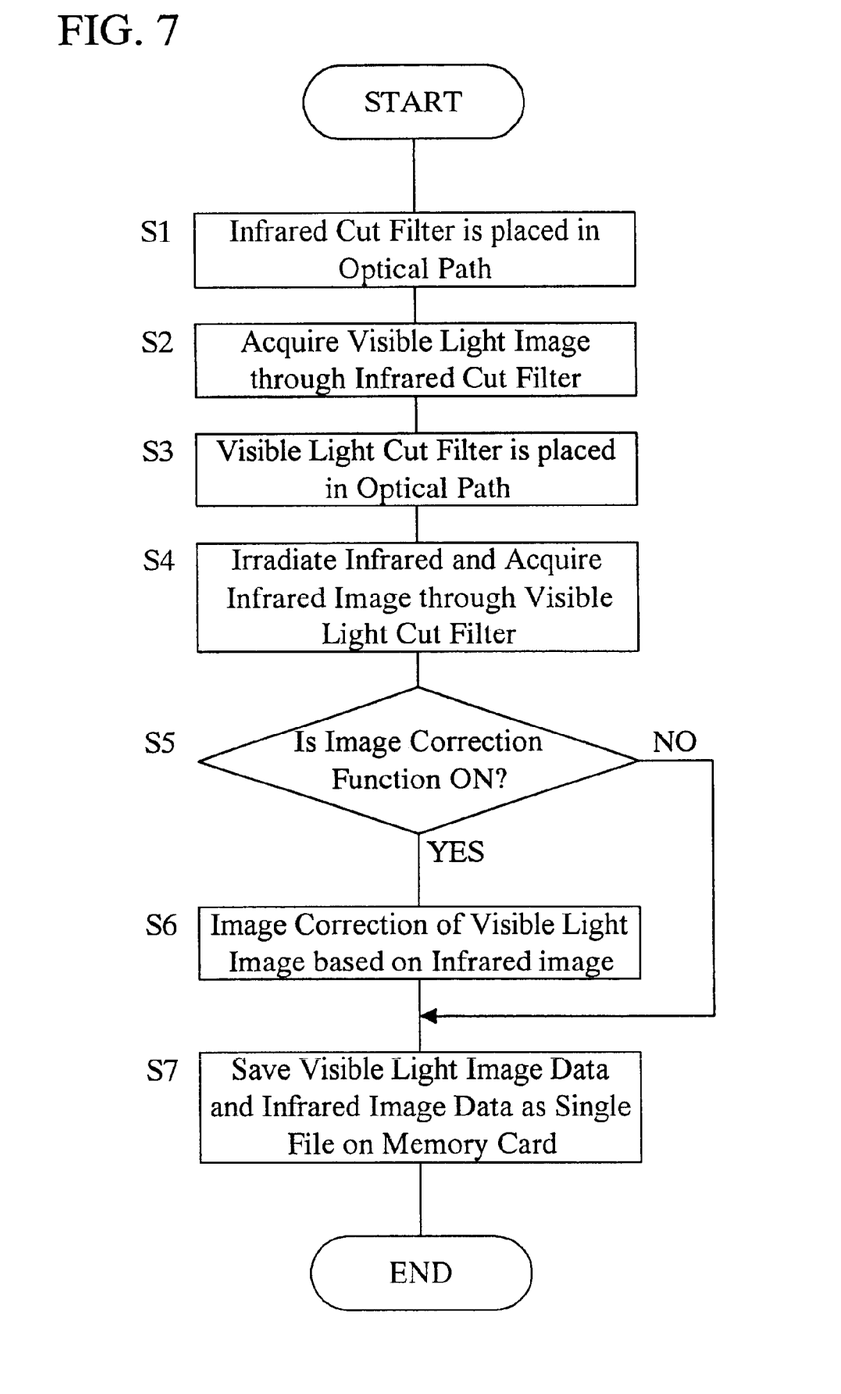
FIG. 7 is a flow chart showing the photographic operations of the digital camera 1.

FIG. 7 is a flow chart showing the operation relating to photography by the digital camera 1. The operation is automatically executed by the CPU 51 when image acquisition is specified.

In step S1, the infrared cut filter 45 is placed in the optical path LR by driving the selection drive unit 49.

Figure 8A:
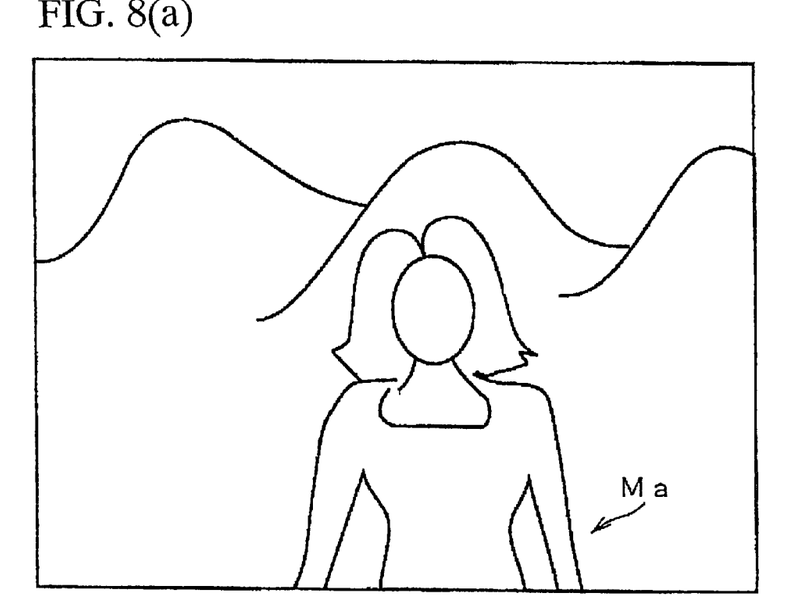

In step S2, an object is photographed through the infrared cut filter 45 positioned on the optical path LR, and visible light image data are acquired as first image data by the CCD 41. FIG. 8(*a*) shows an example of an acquired visible light image.

In step S3, the visible light cut filter 46 is positioned on the optical path LR by driving the selection drive unit 49. Since it is necessary to maintain identicalness of the object when switching from the infrared cut filter 45 to the visible light cut filter 46, it is desirable the latter image is subjected to image processing rapidly after image processing of the former.

Figure 8B:
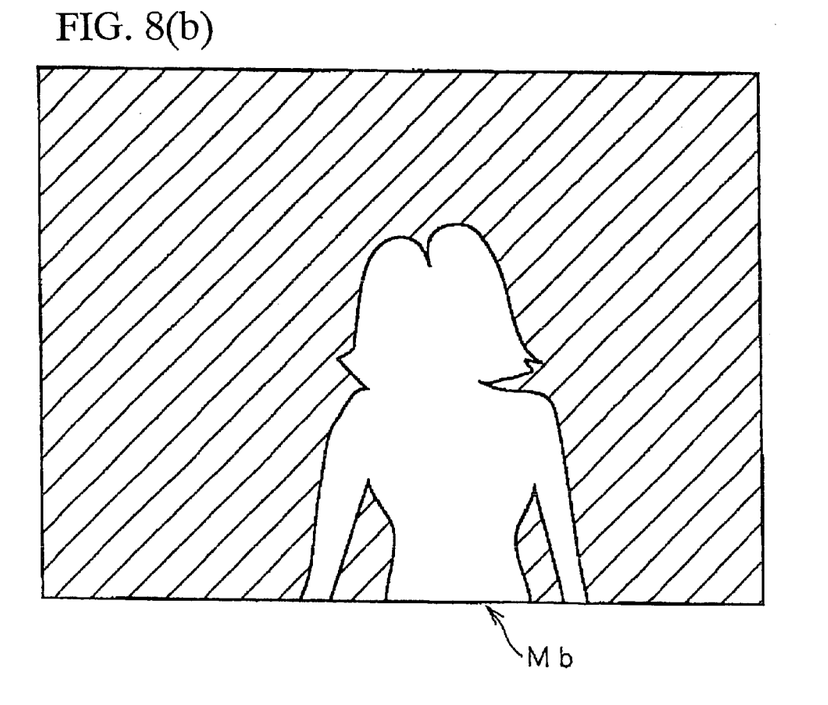

In step S4, the object is irradiated at an irradiation angle approximately identical to the field angle of the taking lens by near-infrared light from the infrared emitter 32, and the object is photographed through the visible light cut filter 46 positioned on the optical path LR, to acquire infrared image data as second image data by the CCD 41. FIG. 8(*b*) shows an example of an acquired infrared image. As shown in FIG. 8(*b*), the image of the main object Mb of the person can be readily recognized in the complete image.

The infrared radiation emitted from the infrared emitter 32 only reaches the near-distance objects, i.e., the main object Mb, and the reflected infrared light from the objects in the background in the far distance behind the main object Mb does not reach the CCD 41, such that the main object Mb is photographed as if floating.

In this case it is desirable that the intensity of the near-infrared light is rather strong. Furthermore, since the sensitivity of the human eye is reduced in this wavelength range, the glare is not sensed and the existence of the emitted light cannot be confirmed.

When both the infrared emitter 25 and the infrared emitter 32 are equipped, whether both emit light or only one emit light may be automatically selected based on measurement of the intensity of the infrared light from the object by the CCD 41.

Steps S1, S2, S3, and S4 may be reversed, and the visible light image data acquired after the infrared image data are acquired.

In step S5, a user determines whether or not the image correction function is turned ON for visible light image data by operating the operation unit 20. When the image correction function is set to ON, the routine continues to step S6, whereas when the function is turned OFF, the routine advances to step S7.

In step S6, image correction of the visible light image is executed based on the infrared image data. That is, the image of the main object Ma in the visible light image shown in FIG. 8(*a*) is extracted from the position information of the image of the main object Mb extracted from the infrared image shown in FIG. 8(*b*). Then, the image of the extracted main object Ma and the background outside the main object image Ma are subjected to image processing. For example, skin tone color correction of the image of the human main object Ma, and shading of the background area are performed.

In step S7, the visible light image data and the infrared image data are saved to the same file on the memory card. For example, the visible light image data may be saved as 12-bit data, and the infrared image data may be saved as 4-bit data. By saving the data to the same file in this way, the correspondence between the visible light image and the infrared image relating to the same object becomes clear, and the handling of the two sets of image data is more convenient.

When saving image data, it is desirable that the infrared image data are compressed and saved. This is done because the infrared image data, the main point of which is to recognize the main object, can binarily distinguish between the main object image and other data compared to the visible light image data. In this way greater efficiency is attained in saving data on the memory card 9. When the visible light image data are compressed and saved, the infrared image data also may be compressed at a higher compression rate and saved.

A visible light image and a non-visible light image of the same object can be easily acquired by a single CCD 41 simply by switching the infrared cut filter 45 and visible light cut filter 46 via an operation by the digital camera 1 as described above.

Other examples of the use of the digital camera 1 are described below with reference to FIGS. 9(*a*) and 9(*b*).

In this usage example, a print object Pa placed on a table, and a print object Pb reproducing the text of the pattern of the print object Pa by an inkjet printer are discriminated.

Figure 9A:
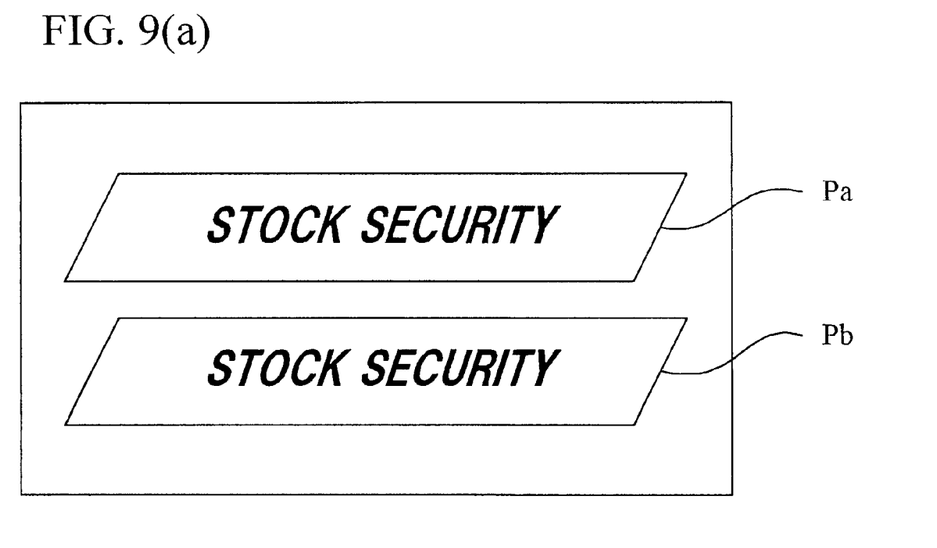
Figure 9B:
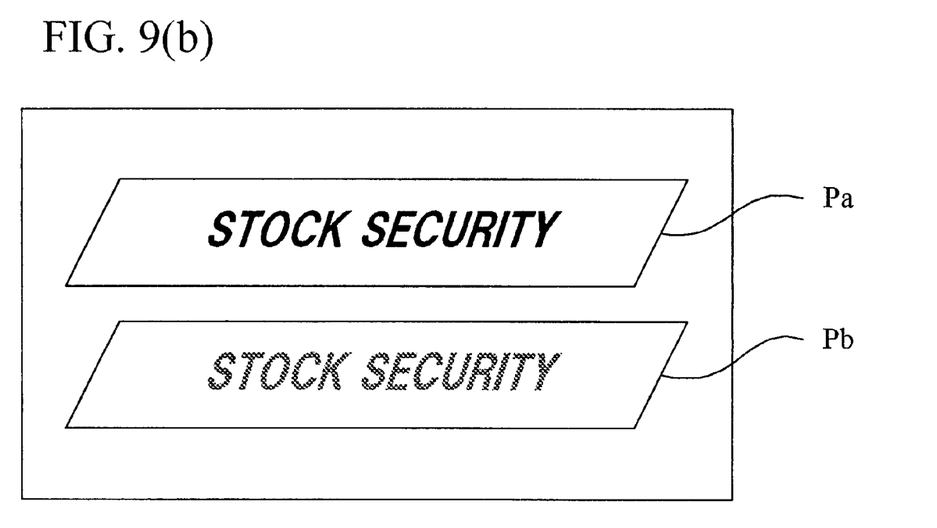

In this case, also, the visible light image shown in FIG. 9(a) and the infrared image shown in FIG. 9(*b*) are acquired while maintaining the identicalness of the main objects as described above. Image extraction of the two print images Pa and Pb can not be performed because the desk of the background of the print object PA and the print object Pb are an identical distance from the digital camera 1. However, although the two print objects Pa and Pb are recognized as identical in the visible light image shown in FIG. 9(*a*), the print objects Pa and Pb are distinguished as different in the infrared image shown in FIG. 9(*b*) because the text part of the print object Pa and the text part of the print object Pb have different reflectivity in the near-infrared range.

If the density of the images of the infrared range are compared using the characteristics of the infrared image, the print object Pb can be distinguished as having been manufactured with ink having a different reflectivity in the infrared range than the main print object Pa.

Differences in properties can be distinguished by acquiring infrared data not only in the case of the printing ink of text, but also for any objects having clear differences in reflectivity in the infrared range.

Second Embodiment

Essential Structure of an Image Processing System

Figure 10:
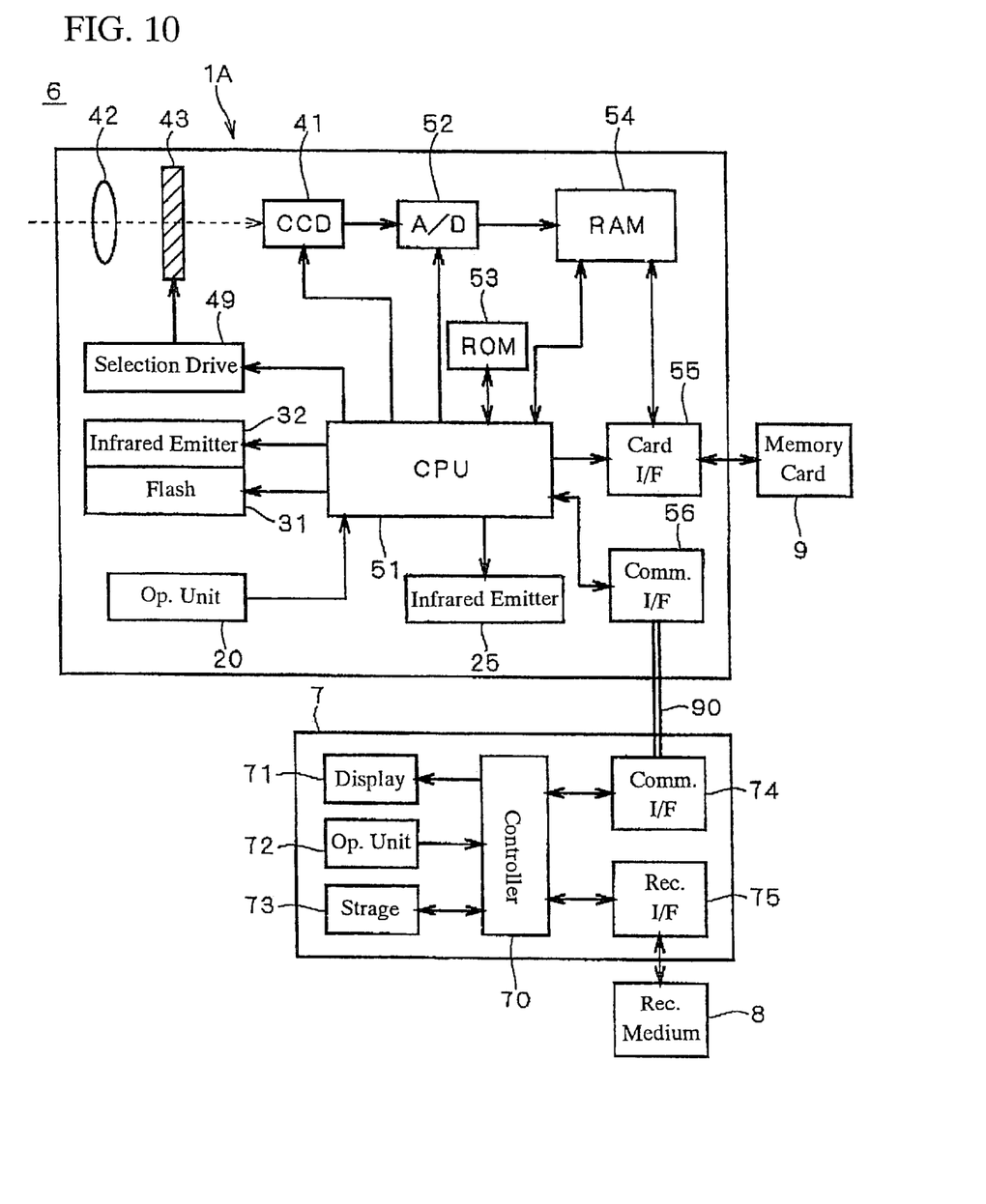
FIG. 10 shows function blocks of an image processing system 4 of a second embodiment of the invention.

FIG. 10 shows the function blocks of an image processing system of a second embodiment.

An image processing system 6 comprises a digital camera 1A similar to that of the first embodiment, and an image processing device 7 such as a personal computer (PC) or the like connected to the digital camera 1A via a communication line 90 so as to be capable of communication.

The digital camera 1A has a communication I/F 56 in the digital camera 1 of the first embodiment.

The communication I/F 56 is an interface for communicating data with the PC 7 over the communication line 90.

The PC 7 is provided with a controller 70, display device 71 electrically connected to the controller 70, input operation unit 72, memory device 73, communication I/F 74, and memory I/F 75.

The display device 71 has a monitor and displays based on specifications from the controller 70.

The input operation unit 72 has a mouse and keyboard, and receives the input from a user on the information processing device 7.

The memory device 73 is provided with, for example, a hard disk, and stores image data acquired by the digital camera 1A.

The communication I/F 74 is an interface for communicating data with the digital camera 1A over the communication line 90.

The recording I/F 75 is an interface for input/output o f data t o/from a removable recording medium such as a CD-ROM, floppy disk FD, memory card and the like.

The controller 70 has a CPU and memory, and performs general control of the operations information processing device 7 by organically controlling each part. The memory of the controller 70 stores program data recorded on the recording medium 8 via the recording I/F. In this way the stored programs reflect the operation of the information processing device 7.

Operation of the Image Processing System 6

The basic operation of the image processing system 6 is similar to the operation of the digital camera 1 of the first embodiment shown in the flow chart of FIG. 7.

That is, after the operation (steps S1 to S7) of the flow chart of FIG. 7 is executed by the digital camera 1A, visible light image data and infrared image data stored on the memory card are transmitted to the information processing device 7 over the communication line 90.

When image correction is desired by the user in the information processing device 7, an operation similar to that of step S6 in FIG. 7 is executed.

That is, region discrimination, extraction, and image correction are executed for the visible light image received from the digital camera 1 based on the infrared image data received from the digital camera 1. In this case the image of the main object in the visible light image is extracted, and the extracted image of the main object, or the background outside the image of the main object Ma is subjected to image correction.

The visible light image data and the infrared image data acquired by the digital camera 1 are not necessarily received by the information processing device 7 via the communication line 90, inasmuch as they may be received via the removable recording medium 8 or the like.

Image correction is performed based on the main object image extracted by the information processing device 7 using the visible light image and non-visible light image acquired by the digital camera 1A in an operation by the image processing system 6.

Modifications

Figure 11:
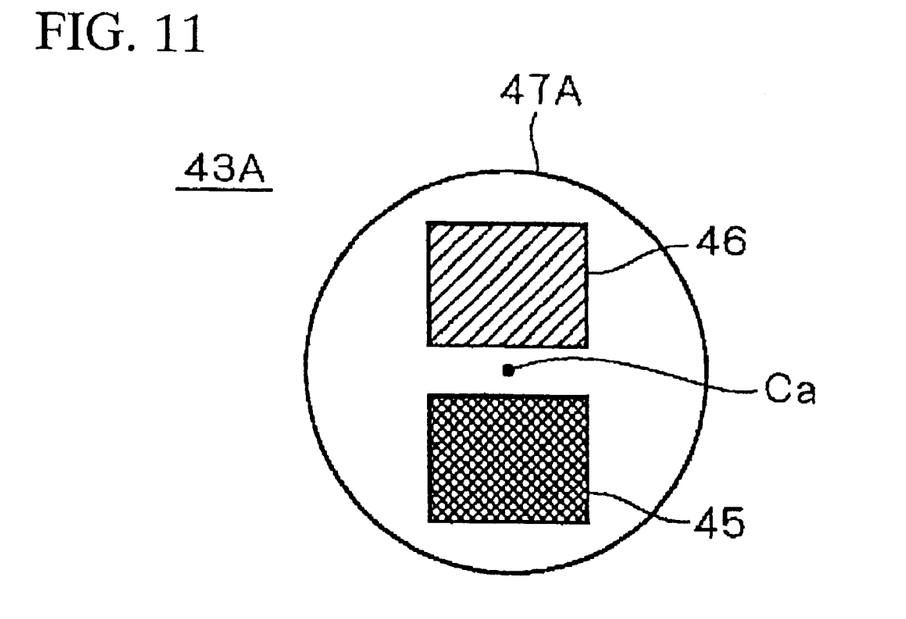
FIG. 11 shows the structure of an optical filter unit 43A in a modification.
Figure 12:
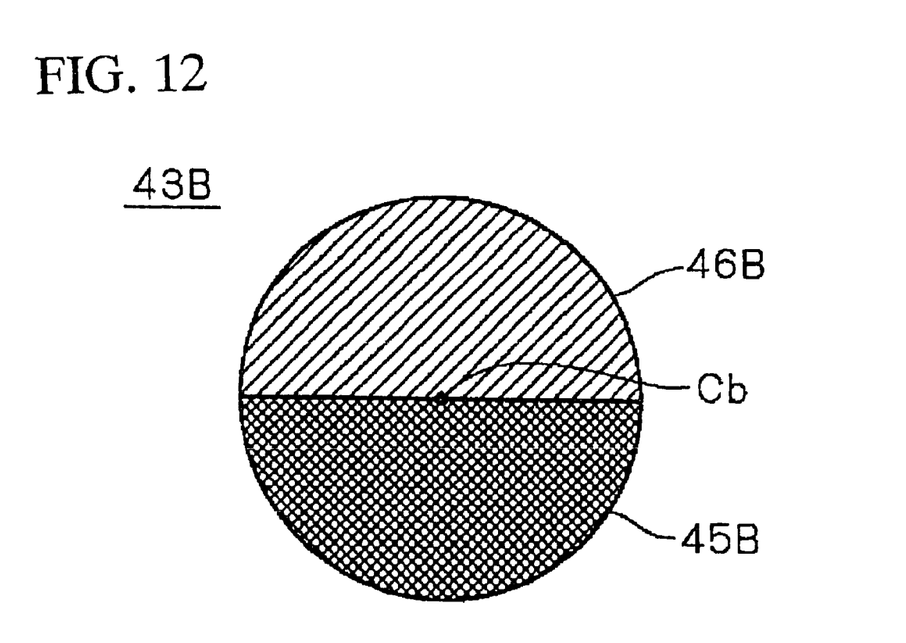
FIG. 12 shows the structure of an optical filter unit 43B in a modification.

The optical filter unit may use the optical filters 43A and 43B shaped as shown in FIGS. 11 and 12.

The optical filter unit 43A has an infrared cut filter 45 and a visible light cut filter 46 supported by a disk-shaped holder 47A.

The infrared cut filter 45 and the visible light cut filter 46 are switchable by rotating the optical filter unit 43A about a center point Ca of the holder 47A.

Furthermore, the optical filter unit 43B has a disk shape wherein a semicircular infrared cut filter 45B and a visible light cut filter 46B are joined.

In this case, also, the infrared cut filter 45B and the visible light cut filter 46B are switchable by rotating the optical filter unit 43B about a center point Ca.

The image sensing element is not limited to a CCD, inasmuch as a MOS-type element also may be used.

The optical filter is not limited to the combination of the aforesaid infrared cut filter and infrared-transmitting visible light cut filter, and a combination of an ultraviolet cut filter and ultraviolet transmitting visible light cut filter also may be used. In this case, an object is irradiated with ultraviolet radiation rather than infrared radiation.

The visible light transmitting filter also may be a filter which selectively transmits part of the visible light range, e.g., blue light.

The two sets of image data also may be saved to different files and need not be saved to the same file. When saving image data, it is desirable that the file names are associated each other, for example, to allow user to recognize the association of two sets of image data.

Furthermore, the saved image data may be two sets of image data of the visible light image, and differential image data of the visible light image and the infrared image.

The digital camera is applicable not only to still photography and automatic continuous photography, but also dynamic image video photography.

The visible light image data and the infrared image data are desirably acquired while closely maintaining the identicalness of the main object, but there is no hindrance if both main objects are somewhat different such as when image processing is only performed on the background a certain degree of separation from the main object image. That is, image data are satisfactory insofar as the identicalness of the actual main object can be maintained.

Although the infrared emitter 32 having an irradiation angle covering the field angle of the taking glens is provided in a separate device to the camera body, the emitter 32 may be provided on the camera body and jointly used for autofocus supplement light. That is, the infrared emitter 25 provided in the camera body also may emit infrared light in a range covering the field angle of the taking lens.

According to the embodiments described above, the identicalness of the actual main object is maintained when switching the filter for selectively transmitting light of the visible light wavelength range, and a filter for selectively transmitting light of a wavelength range different from the visible light wavelength range, so as to acquire first image data and second image data by an image sensing element. As a result, a visible light image and non-visible light image are easily acquired of the same object.

Particularly when the wavelength range different from the visible light wavelength range is the infrared wavelength range, an infrared image is easily acquired using the characteristics of the image sensing element. Furthermore, infrared images can be acquired more efficiently by providing an infrared light emitting unit for irradiating an object with infrared light from the infrared emitting unit.

Convenience in handling the associated image data is improved by saving the acquired first image data and second image data in the same file. The image data can be saved more efficiently by compressing the second image data when saving the image data.

Obviously, many modifications and variation of the present invention are possible in light of the above teachings. It is therefore to be understood that within the scope of the appended claims, the invention may be practiced other than as specifically described.

What is claimed is:

1. A digital image sensing apparatus, comprising:
   an image sensor for acquiring an object image as image data;
   a first filter for selectively transmitting light of a first wavelength band of visible light;
   a second filter for selectively transmitting light of a second wavelength band of different from the first wavelength;
   a switching device for arranging and switching the first filter and the second filter in an optical path of a photographic optical system connecting the object and the image sensor;

a controller for controlling a first operation for acquiring by the image sensor an object image transmitted through the first filter as first image data, and a second operation for acquiring by the image sensor an object image transmitted through the second filter as second image data while maintaining substantially similar characteristics of the object; and a recording device for recording the first image data and the second image data as the same file on a recording medium.

2. The digital image sensing apparatus as claimed in claim 1, wherein a characteristic of the second wavelength band is a wavelength band in the infrared range.

3. The digital image sensing apparatus as claimed in claim 2, further comprising a light emitting device for emitting infrared light, and wherein the controller controls the emission of infrared light from the light emitting device so as to irradiate an object and acquire second image data.

4. The digital image sensing apparatus as claimed in claim 2, further comprising a light emitting device for emitting infrared light to a field angle approximately equal to a field angle of the photographic optical system.

5. The digital image sensing apparatus as claimed in claim 1, wherein the recording device compresses and stores second image data.

6. The digital image sensing apparatus as claimed in claim 1, further comprising an image processing device for extracting a main object image from the first image data based on the second image data, and for executing an image processing on the first image data based on the information of the extracted main object image.

7. An image processing system comprising a digital image sensing apparatus of claim 1 and information processing device, wherein the information processing device has an image processing device which extracts a main object image from the first image data based on the second image data, and executes image processing on the main object image of the extracted first image data.

8. A digital image sensing method for acquiring an object image as image data, comprising following steps of:

acquiring an object image transmitted through a first filter, which selectively transmits light of a first wavelength band of visible light, as first image data via an image sensor; and acquiring an object image transmitted through a second filter, which selectively transmits light of a second wavelength band different from the first wavelength band, as second image data via an image sensor, and wherein the first image data and the second image data are acquired while maintaining substantially similar characteristics by executing the first image acquisition process and the second image acquisition process in a specific sequence; and recording the first image data and the second image data as a single file on a recording medium.

9. A computer program for executing image processing by a computer to function as an information processing apparatus, wherein the computer program executes processes of claim 8.

10. A computer readable recording medium for recording a image processing program for executing image processing by a computer, wherein the image processing program execute processes of claim 8.

11. A digital camera, comprising:

an image sensor for acquiring an object image as image data;

a light emitting device for emitting infrared light at an irradiation angle in a field angle approximately equal to a filed angle of an image sensing optical system;

a first filter for selectively transmitting light of the visible light wavelength band;

a second filter for selectively transmitting light of the infrared light wavelength band;

a switching device for arranging and switching the first filter and the second filter in an optical path of the image sensing optical system connecting the object and the image sensor; and a controller for controlling a first operation for acquiring by the image sensor an object image transmitted through the first filter as first image data, and a second operation for acquiring by the image sensor an object image transmitted through the second filter as second image data by controlling the actuation of the switching device.

12. The digital camera as claimed in claim 11, further comprising a recording device for recording the first image data and the second image data as a single file on a recording medium.

13. The digital camera as claimed in claim 11, further comprising a recording device for recording the first image data and the second image data in separate associated files on a recording medium.

14. The digital camera as claimed in claim 11, wherein the first and second image data are acquired sequentially.

15. The digital image sensing apparatus as claimed in claim 11, wherein the first and second image data are acquired sequentially.

16. The digital image sensing method as claimed in claim 8, further comprising the step of sequentially acquiring the first and second image data.

* * * * *